US006386335B1

(12) United States Patent
DiPonio

(10) Patent No.: US 6,386,335 B1
(45) Date of Patent: May 14, 2002

(54) ANCHOR BRACKET AND BRAKE SHOE ASSEMBLY FOR USE IN A DISC BRAKE ASSEMBLY

(75) Inventor: Victor M. DiPonio, Novi, MI (US)

(73) Assignee: Kelsey-Hayes Company, Livonia, MI (US)

(*) Notice: Subject to any disclaimer, the term of this patent is extended or adjusted under 35 U.S.C. 154(b) by 0 days.

(21) Appl. No.: 10/024,926

(22) Filed: Dec. 19, 2001

Related U.S. Application Data

(63) Continuation of application No. 09/605,115, filed on Jun. 28, 2000, now Pat. No. 6,345,701.

(51) Int. Cl.[7] .............................................. F16D 55/00
(52) U.S. Cl. .................................. 188/73.31; 188/250 B
(58) Field of Search ........................ 188/73.31, 250 B, 188/250 D, 370, 73.35–73.39, 73.1, 73.2, 73.41–73.46, 250 E

(56) References Cited

U.S. PATENT DOCUMENTS

| | | | | | |
|---|---|---|---|---|---|
| 4,940,119 A | * | 7/1990 | Kondo et al. | ............ | 188/73.31 |
| 5,113,978 A | * | 5/1992 | Weiler et al. | ............ | 188/250 B |
| 5,297,659 A | * | 3/1994 | Thiel et al. | ................ | 188/370 |
| 5,535,856 A | * | 7/1996 | McCormick et al. | .... | 188/73.36 |
| 6,189,659 B1 | * | 2/2001 | Doi et al. | ................ | 188/73.31 |
| 6,223,866 B1 | * | 5/2001 | Giacomazza | ............. | 188/73.36 |
| 6,345,701 B1 | * | 2/2002 | Di Ponio | ................ | 188/250 B |

* cited by examiner

Primary Examiner—Paul N. Dickson
Assistant Examiner—Melanie Torres
(74) Attorney, Agent, or Firm—MacMillan, Sobanski & Todd, LLC

(57) ABSTRACT

An anchor bracket and brake shoe assembly adapted for use in a disc brake assembly includes an anchor bracket and a pair of brake shoes supported thereon. The anchor bracket includes an pair of axially and outwardly extending angled arms. The arms include a pair of inboard ends and a pair of outboard ends, at least one of the inboard ends and the outboard ends of the arms being interconnected by a tie bar. Each of the arms includes one of a male end and a female end, the one of the male end and the female end being located along a common arc of the anchor bracket and brake shoe assembly. Each of the brake shoes is generally arcuate in shape and includes a backing plate and a friction pad. Each of said backing plates including opposed ends, the opposed ends being the other one of the male end and the female end and configured so as to generally match the profile of the one of the male end and the female end of the arms so as to slidably support the brake shoes on the arms of the anchor bracket.

12 Claims, 8 Drawing Sheets

ANCHOR BRACKET AND BRAKE SHOE ASSEMBLY FOR USE IN A DISC BRAKE ASSEMBLY

This application is a continuation of application Ser. No. 09/605,115 filed Jun. 28, 2000, now U.S. Pat. No. 6,345,701.

BACKGROUND OF THE INVENTION

This invention relates in general to vehicle disc brake assemblies and in particular to an improved structure for an anchor bracket and brake shoe assembly adapted for use in such a vehicle disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. The disc brake assembly further includes a caliper assembly which is slidably supported on pins secured to an anchor bracket. The anchor bracket is secured to a non-rotatable component of the vehicle, such as the axle flange or steering knuckle, connected to the vehicle frame. The caliper assembly includes a pair of brake shoes which are disposed on opposite sides of the rotor. The brake shoes are connected to one or more hydraulically or pneumatically actuated pistons for movement between a non-braking position, wherein they are spaced apart from opposed axial sides or braking surfaces of the rotor, and a braking position, wherein they are moved into frictional engagement with the opposed braking surfaces of the rotor. When the operator of the vehicle depresses the brake pedal, the piston urges the brake shoes from the non-braking position to the braking position so as to frictionally engage the opposed braking surfaces of the rotor and thereby slow or stop the rotation of the associated wheel of the vehicle.

Typically, the anchor bracket includes a pair of arms interconnected by an inner tie. The anchor bracket includes two pairs of apertures formed therethrough. One of the pairs of apertures is adapted to receive bolts for securing the anchor bracket to the non-rotatable component of the vehicle. The other pair of apertures are adapted to receive bolts or slide pins for slidably supporting the caliper relative to the anchor bracket. In some instances, the anchor bracket may also include an outer tie bar. The arms of the anchor bracket have upstanding guide rails formed thereon for supporting a pair of friction pad assemblies for sliding movement along a pair of anchor bracket guide rails. The friction pad assemblies include friction pads which are disposed on opposite axial sides of the rotor. During braking, the anchor bracket functions to transmit the braking torque through the associated vehicle component to the vehicle frame.

SUMMARY OF THE INVENTION

This invention relates to an anchor bracket and brake shoe assembly adapted for use in a disc brake assembly and includes an anchor bracket and a pair of brake shoes supported thereon. The anchor bracket includes an pair of axially and outwardly extending angled arms. The arms include a pair of inboard ends and a pair of outboard ends, at least one of the inboard ends and the outboard ends of the arms being interconnected by a tie bar. Each of the arms includes one of a male end and a female end, the one of the male end and the female end being located along a common arc of the anchor bracket and brake shoe assembly. Each of the brake shoes is generally arcuate in shape and includes a backing plate and a friction pad. Each of said backing plates including opposed ends, the opposed ends being the other one of the male end and the female end and configured so as to generally match the profile of the one of the male end and the female end of the arms so as to slidably support the brake shoes on the arms of the anchor bracket.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
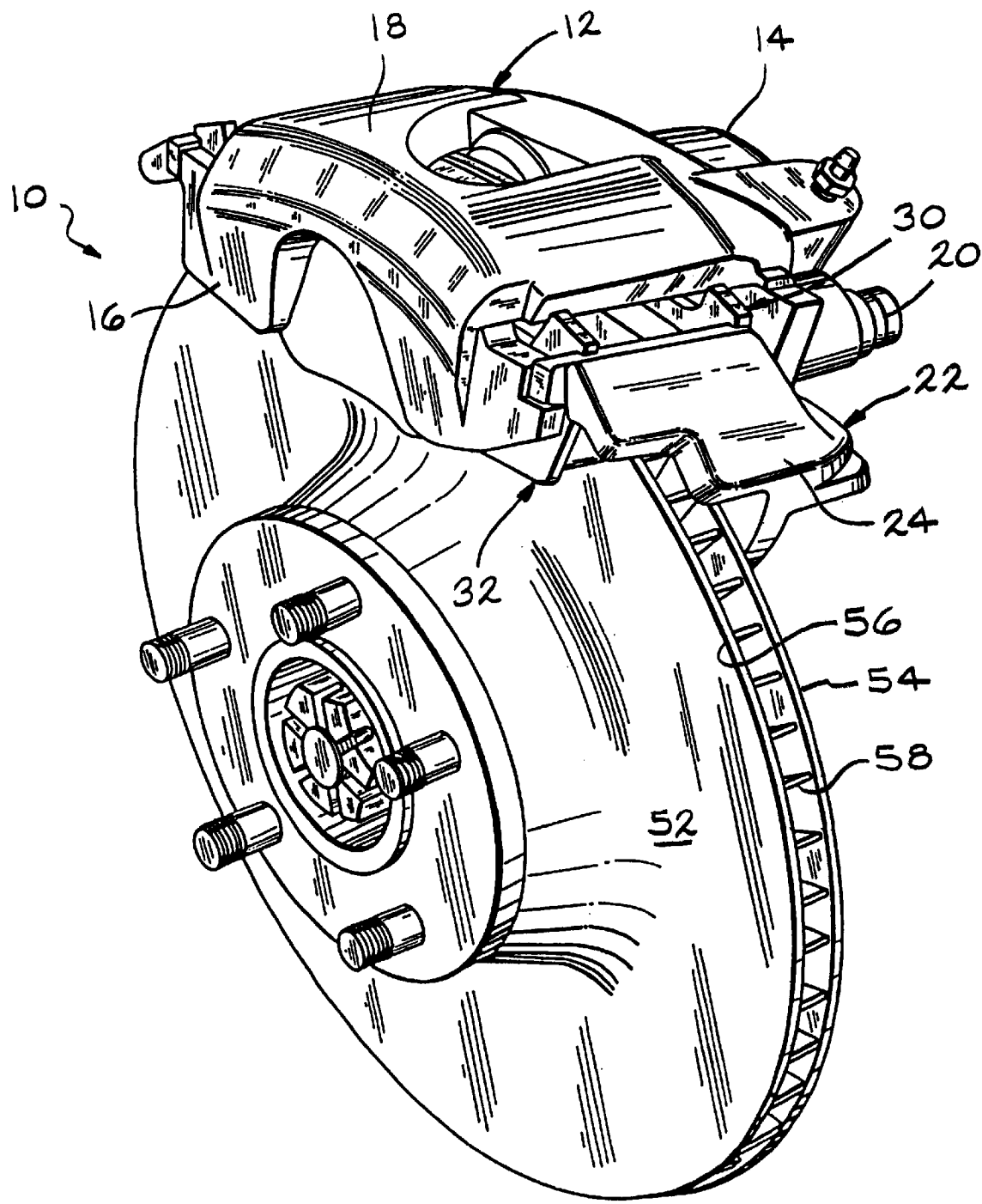
FIG. 1 is a perspective view of a portion of a prior art vehicle disc brake assembly.
Figure 2:
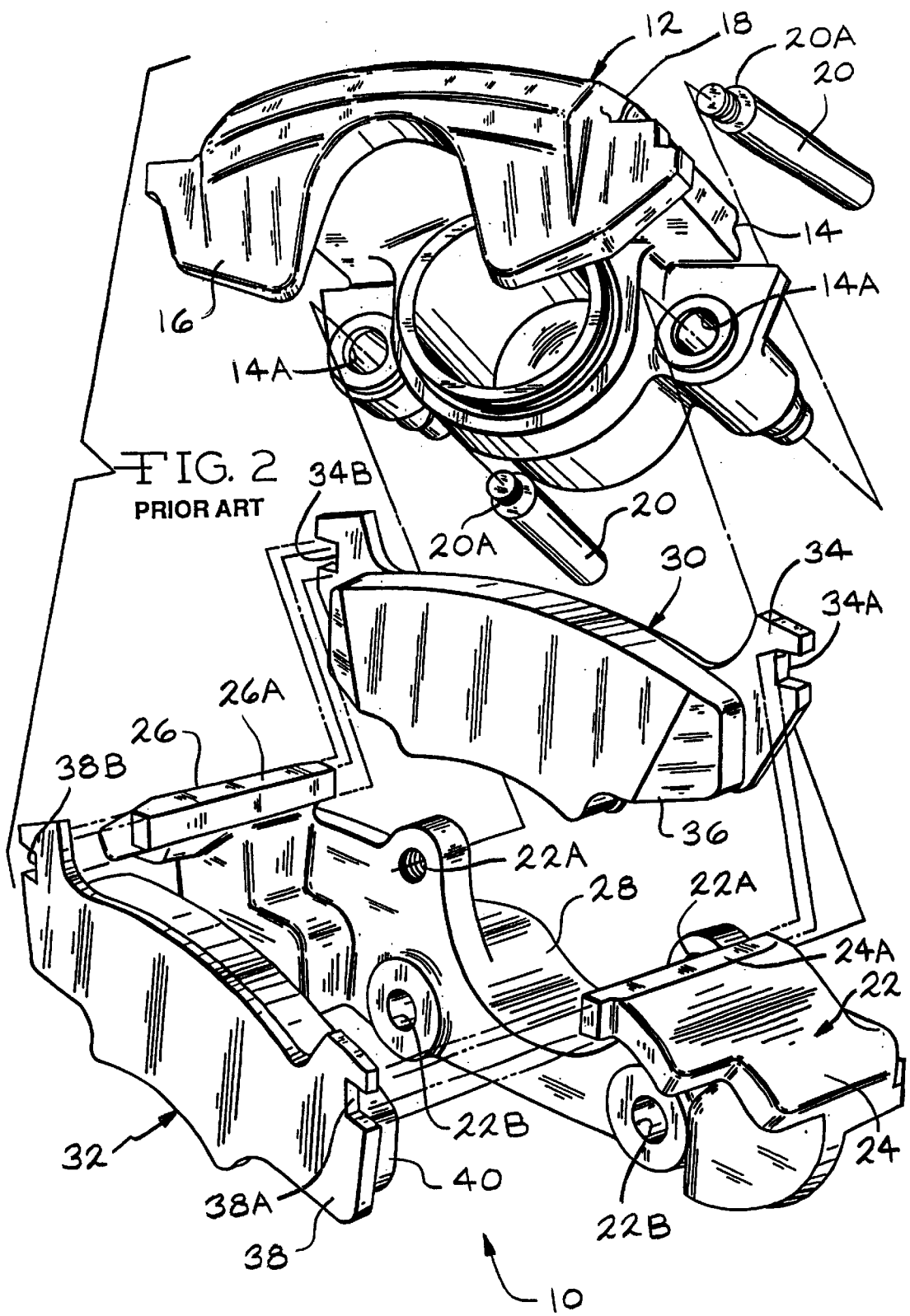
FIG. 2 is an exploded perspective view of selected components of the prior art vehicle disc brake assembly illustrated in FIG. 1.
Figure 3:
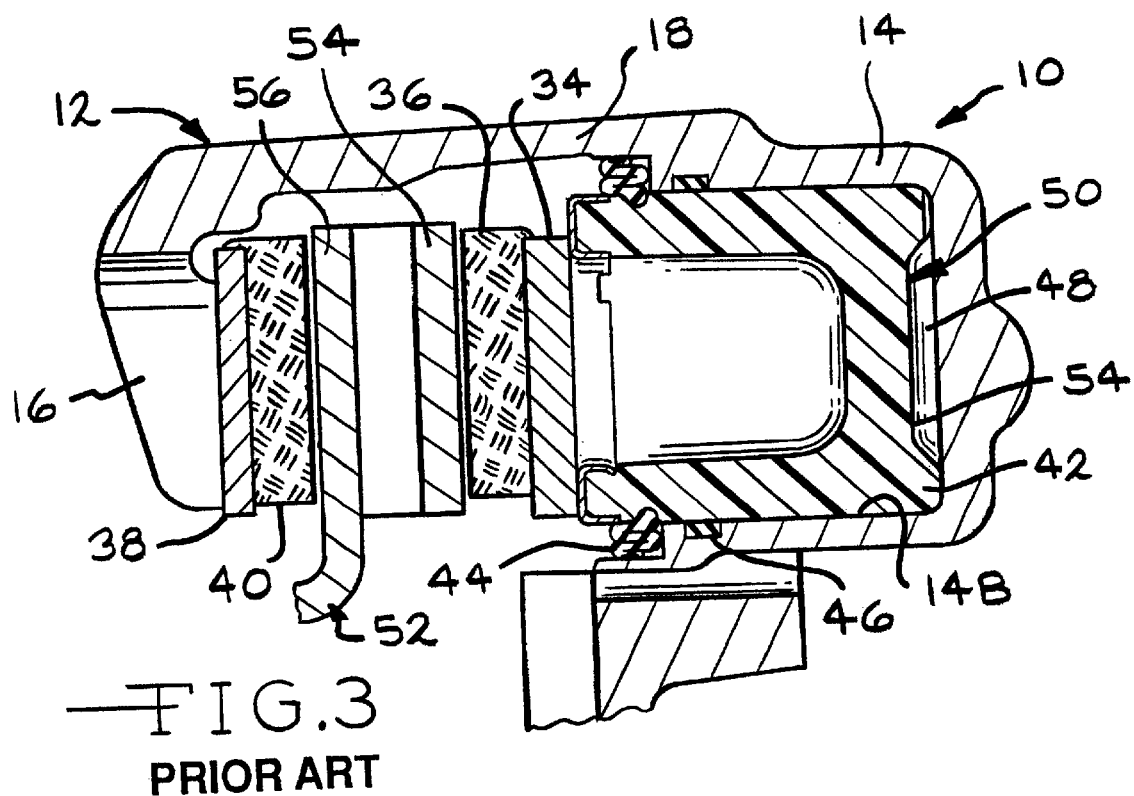
FIG. 3 is a sectional elevational view of a portion of the prior art disc brake assembly illustrated in FIG. 1.

Referring now to the drawings, there is illustrated in prior art FIGS. 1 through 3 a portion of a prior art vehicle disc brake assembly, indicated generally at 10. The general structure and operation of the disc brake assembly 10 is conventional in the art. Thus, only those portions of the disc brake assembly 10 which are necessary for a full understanding of this invention will be explained and illustrated.

The prior art disc brake assembly 10 is a sliding type of disc brake assembly and includes a generally C-shaped caliper, indicated generally at 12. The caliper 12 includes an inboard leg portion 14 and an outboard leg portion 16 which are interconnected by an intermediate bridge portion 18. The caliper 12 is slidably supported on a pair of pins 20 secured to an anchor bracket, indicated generally at 22. The anchor bracket 22 is, in turn, secured to a stationary component of the vehicle. Such a stationary component can be, for example, an axle flange (not shown), when the disc brake assembly 10 is installed for use on the rear of the vehicle, or a steering knuckle (not shown), when the disc brake assembly 10 is installed for use on the front of the vehicle.

The pins 20 extend through non-threaded apertures 14A formed in the inboard leg 14 of the caliper 12. The pins 20 have respective threaded ends 20A which are received in threaded apertures 22A provided in anchor bracket 22. The pins 20 support the caliper 12 for sliding movement relative to the anchor bracket 22 in both the outboard direction (left when viewing prior art FIG. 3) and the inboard direction (right when viewing prior art FIG. 3). Such sliding movement of the caliper 12 occurs when the disc brake assembly 10 is actuated, as will be explained below. In the illustrated prior art embodiment, a pair of bolts (not shown) extend through a pair of non-threaded apertures 22B formed in the anchor bracket 22 to secure the anchor bracket 22 to the stationary vehicle component. Alternatively, other known securing methods can be used to secure the anchor bracket 22 to the stationary vehicle component.

As best shown in prior art FIG. 2, the anchor bracket 22 includes a pair of axially and outwardly extending arms 24 and 26 which are interconnected at their inboard ends by an inner tie bar 28. The arms 24 and 26 have upstanding guide rails 24A and 26A, respectively formed thereon. The guide rails 24A and 26A extend transverse to the arms 24 and 26, respectively, and parallel to one another. The guide rails 24A and 26A slidably support an inboard brake shoe, indicated generally at 30, and an outboard brake shoe, indicated generally at 32, respectively.

The inboard brake shoe 30 includes a backing plate 34 and a friction pad 36. The inboard backing plate 34 includes opposed ends having notches 34A and 34B formed therein, for supporting the inboard brake shoe 30 on the guide rails 24A and 26A of the anchor bracket 22. The outboard brake shoe 32 includes a backing plate 38 and a friction pad 40. The outboard backing plate 38 includes opposed ends having notches 38A and 38B formed therein, for supporting the outboard brake shoe 32 on the guide rails 24A and 26A of the anchor bracket 22. Alternatively, the inboard brake shoe 30 can be supported on a brake piston of the prior art disc brake assembly 10, while the outboard brake shoe 32 can be supported on the outboard leg portion 16 of the caliper 12.

An actuation means, indicated generally at 50 in prior art FIG. 3, is provided for effecting the operation of the disc brake assembly 10. The actuation means 50 includes a brake piston 42 which is disposed in a counterbore or recess 14B formed in the outboard surface of the inboard leg 14 of the caliper 12. The actuation means 50, shown in this embodiment as being a hydraulic actuation means, is operable to move the piston 42 within the recess 14B in the outboard direction (left when viewing prior art FIG. 3). However, other types of actuation means 50, such as for example, electrical, pneumatic, and mechanical types, can be used.

The prior art disc brake assembly 10 also includes a dust boot seal 44 and an annular fluid seal 46. The dust boot seal 44 is formed from a flexible material and has a first end which engages an outboard end of the recess 14B. A second end of the dust boot seal 44 engages an annular groove formed in an outer side wall of the piston 42. A plurality of flexible convolutions are provided in the dust boot seal 44 between the first and second ends thereof. The dust boot seal 44 is provided to prevent water, dirt, and other contaminants from entering into the recess 14B. The fluid seal 46 is disposed in an annular groove formed in a side wall of the recess 14B and engages the outer side wall of the piston 42. The fluid seal 46 is provided to define a sealed hydraulic actuator chamber 48, within which the piston 42 is disposed for sliding movement. Also, the fluid seal 46 is designed to function as a "roll back" seal to retract the piston 42 within the recess 14B (right when viewing prior art FIG. 3) when the brake pedal is released.

The prior art disc brake assembly 10 further includes a rotor 52, which is connected to a wheel (not shown) of the vehicle for rotation therewith. The illustrated rotor 52 includes a pair of opposed braking discs 54 and 56 which are spaced apart from one another by a plurality of intermediate ribs or fins 58 in a known manner. The rotor 52 extends radially outwardly between the inboard friction pad 36 and the outboard friction pad 40.

When it is desired to actuate the prior art disc brake assembly 10 to retard or stop the rotation of the brake rotor 52 and the vehicle wheel associated therewith, the driver of the vehicle depresses the brake pedal (not shown). In a manner which is well known in the art. the depression of the brake pedal causes pressurized hydraulic fluid to be introduced into the chamber 48. Such pressurized hydraulic fluid urges the piston 42 in the outboard direction (toward the left when viewing prior art FIG. 3) into engagement with the backing plate 34 of the inboard brake shoe 30. As a result, the friction pad 36 of the inboard brake shoe 30 is moved into frictional engagement with the inboard braking disc 54 of the rotor 52. At the same time, the caliper 12 slides on the pins 20 in the inboard direction (toward the right when viewing prior art FIG. 3) such that the outboard leg 16 thereof moves the friction pad 40 of the outboard brake shoe 32 into frictional engagement with the outboard braking disc 56 of the brake rotor 52. As a result, the opposed braking discs 54 and 56 of the rotor 52 are frictionally engaged by the respective friction pads 36 and 40 to slow or stop relative rotational movement thereof. The structure and operation of the prior art disc brake assembly 10 thus far described is conventional in the art.

Figure 4:
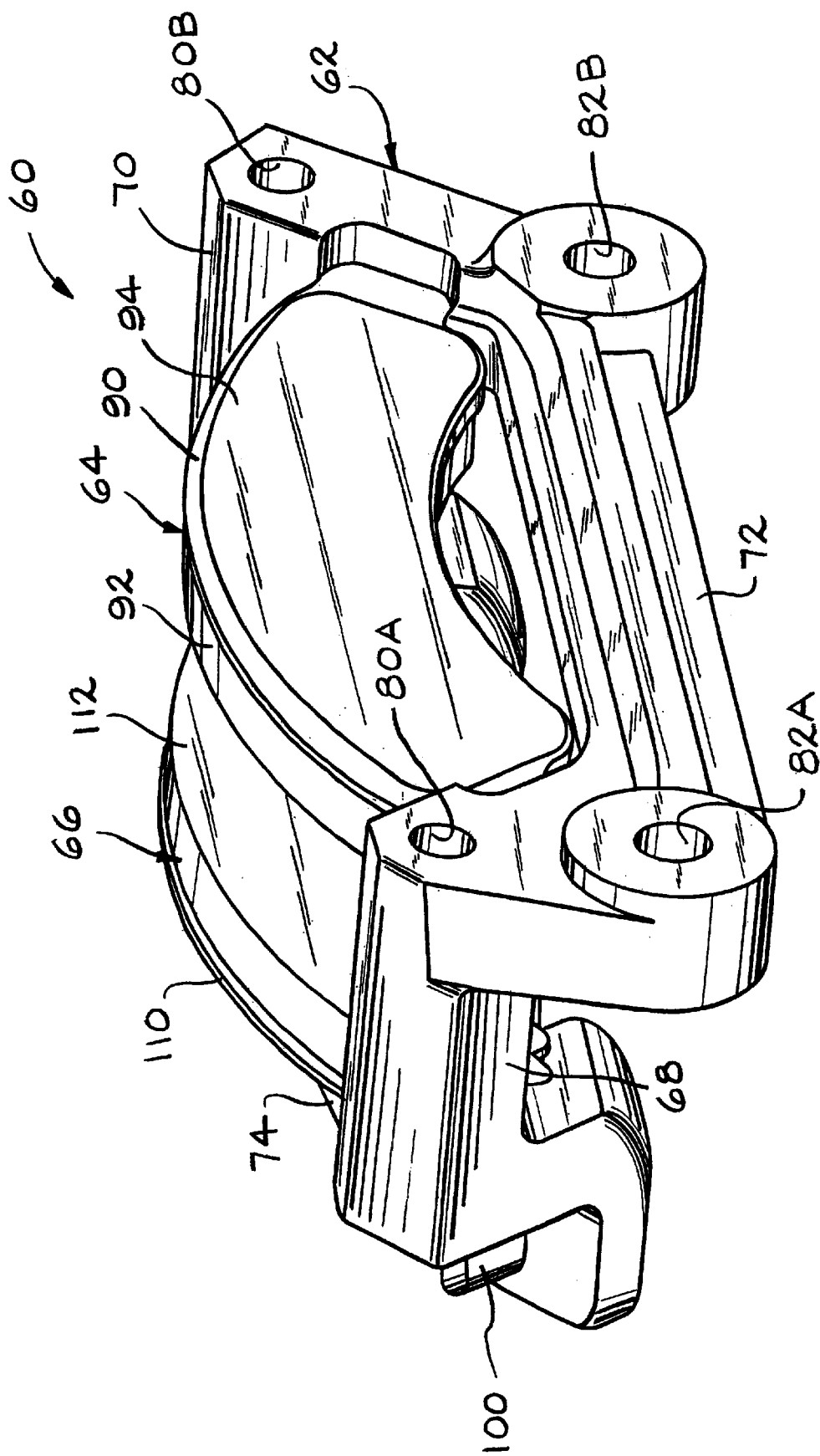
FIG. 4 is a perspective view of a first embodiment of an anchor bracket and brake shoe assembly constructed in accordance with the present invention.
Figure 5:
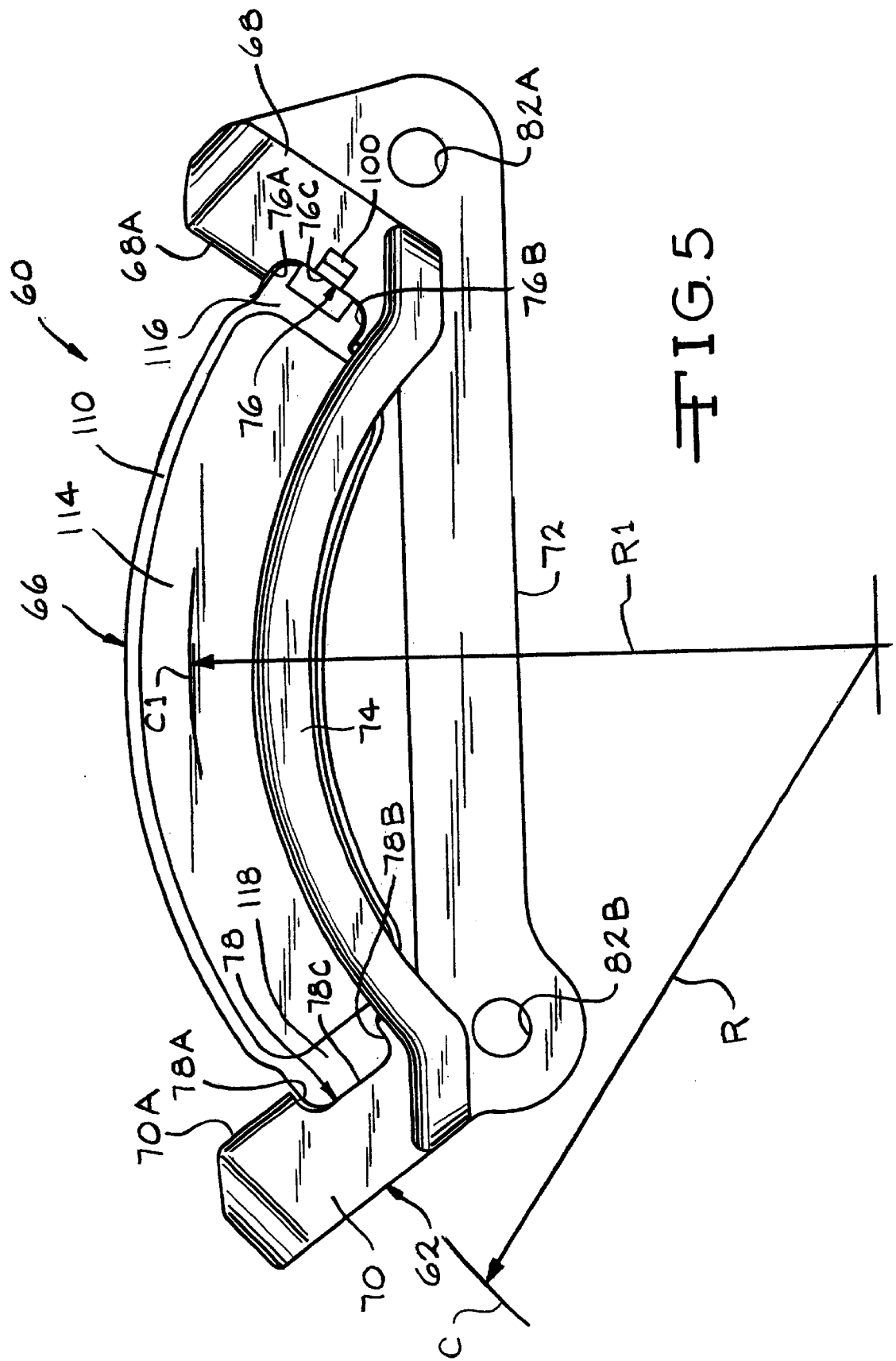
FIG. 5 is an outboard side view of the anchor bracket and brake shoe assembly illustrated in FIG. 4.
Figure 6:
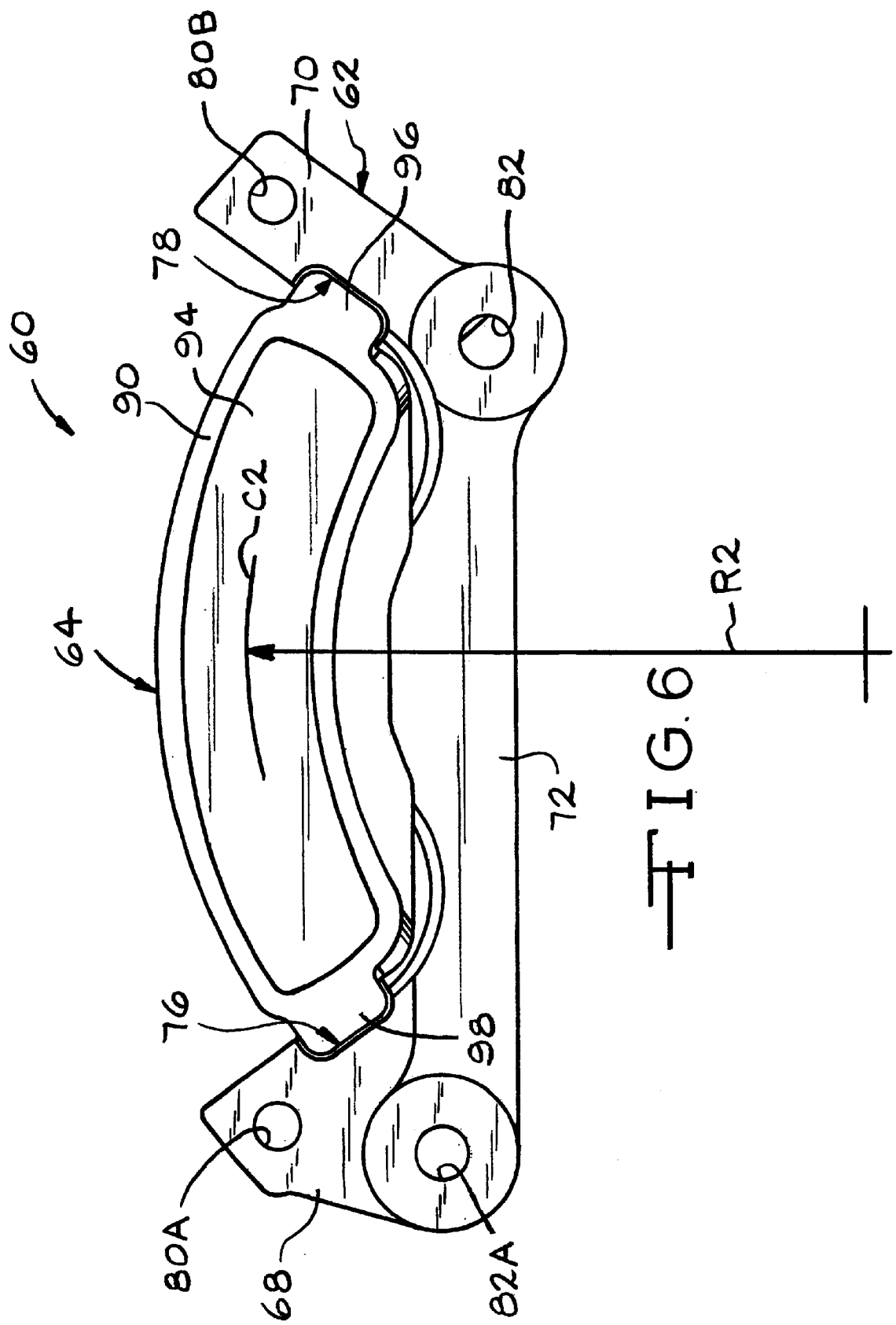
FIG. 6 is an inboard side view of the anchor bracket and brake shoe assembly illustrated in FIG. 4.

Referring now to FIGS. 4 through 6, there is illustrated a first embodiment of an improved structure of an anchor bracket and brake shoe assembly, indicated generally at 60, in accordance with the present invention. The illustrated anchor bracket and brake shoe assembly 60 is for use with a well known "Colette" sliding type of disc brake assembly. The illustrated anchor bracket and brake shoe assembly 60 is associated with a front right wheel of a vehicle.

The anchor bracket and brake shoe assembly 60 includes an anchor bracket, indicated generally at 62, and a pair of brake shoes 64 and 66. The anchor bracket 62 includes a pair of axially and outwardly extending angled arms 68 and 70 which are interconnected at their inboard ends by an inner tie bar 72 and at their outboard ends by an outer tie bar 74. Alternatively, the anchor bracket 62 could be constructed to include only one of the inner tie bar 72 and the outer tie bar 74 if so desired.

The arm 68 defines an outer surface 68A which is oriented at an angle A1 relative to a line X1 which is parallel with respect to a longitudinal axis (not shown) of the prior art disc brake assembly 10. The angle A1 is between about 35 degrees to about 89 degrees. Preferably, the angle A1 is between about 45 degrees to about 85 degrees. More preferably, the angle A1 is about 55 degrees as illustrated in the embodiment shown in FIGS. 4–6.

The arm 68 includes a pair of spaced apart elongated slots or openings 76 formed therein (only one of the slots 76 being illustrated in FIGS. 4–7). In the illustrated embodiment, each of the slots 76 is of a generally rectangular cross section and includes a pair of side walls 76A and 76B and a bottom wall 76C. In the illustrated embodiment, the side walls 76A and 76B are identical to one another, are generally parallel with respect to one another, and extend a predetermined distance or depth D1, shown in FIG. 7. The bottom wall 76C is generally parallel with respect to the outer surface 68A, generally perpendicular with respect to the side walls 76A and 76B, and extends a predetermined distance or width W1.

In the illustrated embodiment, the transition from the side walls 76A and 76B to the bottom wall 76C of the slot 76 is accomplished with a curved or radius wall. As will be discussed below, the particular configuration of the slots 76 is selected so as to generally correspond to the profile of the associated ends of the brake shoes 64 and 66 so as to enable the brake shoes 64 and 66 to be disposed therewithin in a sliding relationship therewith. Alternatively, the configuration of one or more of the walls 76A, 76B and 76C of the slots 76 and/or the configuration of the slots 76 can be other than illustrated if so desired. For example, the slots 76 could be generally circular shaped, oval shaped, or any other desired shape.

The arm 70 defines an outer surface 70A which is oriented at an angle A2 relative to a line X2 which is parallel with respect to the longitudinal axis X of the prior art disc brake assembly 10. The angle A2 is between about 35 degrees to about 89 degrees. More preferably, the angle A2 is between about 45 degrees to about 85 degrees. More preferably, the angle A2 is about 55 degrees as illustrated in the embodiment shown in FIGS. 4–6.

The arm 70 includes a pair of spaced apart elongated slots or openings 78 formed therein (only one of the slots 78 being illustrated in FIGS. 4–7). In the illustrated embodiment, each of the slots 78 is of a generally rectangular cross section and includes a pair of side walls 78A and 78B and a bottom wall 78C. In the illustrated embodiment, the side walls 78A and 78B are identical to one another, are generally parallel with respect to one another, and extend a predetermined distance or depth D2. The bottom wall 78C is generally parallel with respect to the outer surface 70A, generally perpendicular with respect to the side walls 78A and 78B, and extends a predetermined distance or width W2. In the illustrated embodiment, the transition from the side walls 78A and 78B to the bottom wall 78C of the slot 78 is accomplished with a curved or radius wall. As will be discussed below, the particular configuration of the slots 78 is selected so as to generally correspond to the profile of the associated ends of the brake shoes 64 and 66 so as to enable the brake shoes 64 and 66 to be disposed therewithin in a sliding relationship therewith. Also, as shown in FIG. 5, the center of the slots 76 and 78 are located along a common arc C defined by a radius R of the anchor bracket and brake shoe assembly 60. Alternatively, the configuration of one or more of the walls 78A, 78B and 78C of the slots 78 and/or the configuration of the slots 78 can be other than illustrated if so desired. For example, the slot 78 could be generally circular shaped, oval shaped, or any other desired shape.

The anchor bracket 62 further includes a first pair of spaced apart non-threaded openings 80A and 80B, and a second pair of spaced apart openings 82A and 82B. The openings 80A and 80B are adapted to receive an associated slide pin (not shown) of a "Colette" style sliding brake caliper in a known manner. Alternatively, as will be discussed in connection with FIG. 8, the anchor bracket 62 could be provided with threaded openings (similar to the threaded openings 22A shown in prior art FIG. 2) for supporting and securing a disc brake caliper (such as the caliper 12 shown in prior art FIG. 2) via a pair of pins (such as the pins 20 shown in prior art FIG. 2). The openings 82A and 82B are adapted to receive a pair of bolts (not shown) which extend therethrough and which are received in threaded openings provided in the stationary vehicle component (not shown) to thereby secure the anchor bracket 62 to the stationary vehicle component. Alternatively, other known securing means can be provided for securing the anchor bracket 62 to the stationary vehicle component.

As shown in FIG. 5, the outboard brake shoe 66 is generally arcuate in shape and includes a backing plate 110 and a friction pad 112. In the illustrated embodiment, the outboard brake shoe 66 is provided with insulating material 114 on the exterior face thereof. The outboard backing plate 110 includes opposed ends 116 and 118 which are adapted to be received in the slots 76 and 78, respectively, of the anchor bracket 62. In particular, the ends 116 and 118 of the outboard backing plate 110 are configured so at to generally match the profiles of the respective slots 76 and 78. In the illustrated embodiment, a pair of anti-rattle clips 100 are installed in the slots 76 of the arm 68 of the anchor bracket 62 (only one of the pair of clips 100 being shown in FIGS. 4 and 5) to capture the ends 116 and 98 of the brake shoes 66 and 64. Alternatively, a pair of anti-rattle clips (not shown) can be installed in the slots 78 of the arm 70 of the anchor bracket 62 to capture the ends 118 and 96 of the respective brake shoes 66 and 64; or pairs of clips can be installed in both of the slots 76 and 78 of the respective arms 68 and 70 if so desired. Also, as shown in FIG. 5, the center of the brake shoe 66 and the center of the opposed ends 116 and 118 thereof are located along a common arc C1 defined by a radius R1 of the anchor bracket and brake shoe assembly 60.

As shown in FIG. 6, the inboard brake shoe 64 is generally arcuate in shape and includes a backing plate 90 and a friction pad 92. In the illustrated embodiment, the inboard brake shoe 64 is provided with insulating material 94 on the exterior face thereof. The inboard backing plate 90 includes opposed ends 96 and 98 which are adapted to be received in the slots 76 and 78, respectively, of the anchor bracket 62. In particular, the ends 96 and 98 of the inboard backing plate 90 are configured so as to generally match the profiles of the respective slots 76 and 78. An anti-rattle clip (not shown) can be installed on the trailing end 98, the leading end 96, or on both of the ends 96 and 98 of the inboard backing plate 90 of the inboard brake shoe 64 if so desired. In addition, the anchor bracket and brake shoe assembly 60 could include a single anti-rattle (not shown) installed on the trailing ends 116 and 98 of the brake shoes 66 and 64, respectively; or a single anti-rattle (not shown) installed on the trailing ends 116 and 98 of the brake shoes 66 and 64, respectively, and a single anti-rattle (not shown) installed on the leading ends 118 and 96 of the brake shoes 66 and 64, respectively. Also, as shown in FIG. 6, in the illustrated embodiment the center of the brake shoe 64 and the center of the opposed ends 96 and 98 thereof are located along a common arc C2 defined by a radius R2 of the anchor bracket and brake shoe assembly 60. Thus, in the illustrated embodiment, the arcs C, C1, and C2 and therefore the radii R, R1, and R2 are the same. Alternatively, one or more of the arcs C, C1 and C2 could be other than illustrated if so desired. For example, the arcs C1 and C2 could be located other than at the center of the associated brake shoes, and the arcs C1 and C2 of the brake shoes could be the same and concentric with respect to the arc C of the slots 76 and 78 of the anchor bracket 62.

Figure 7:
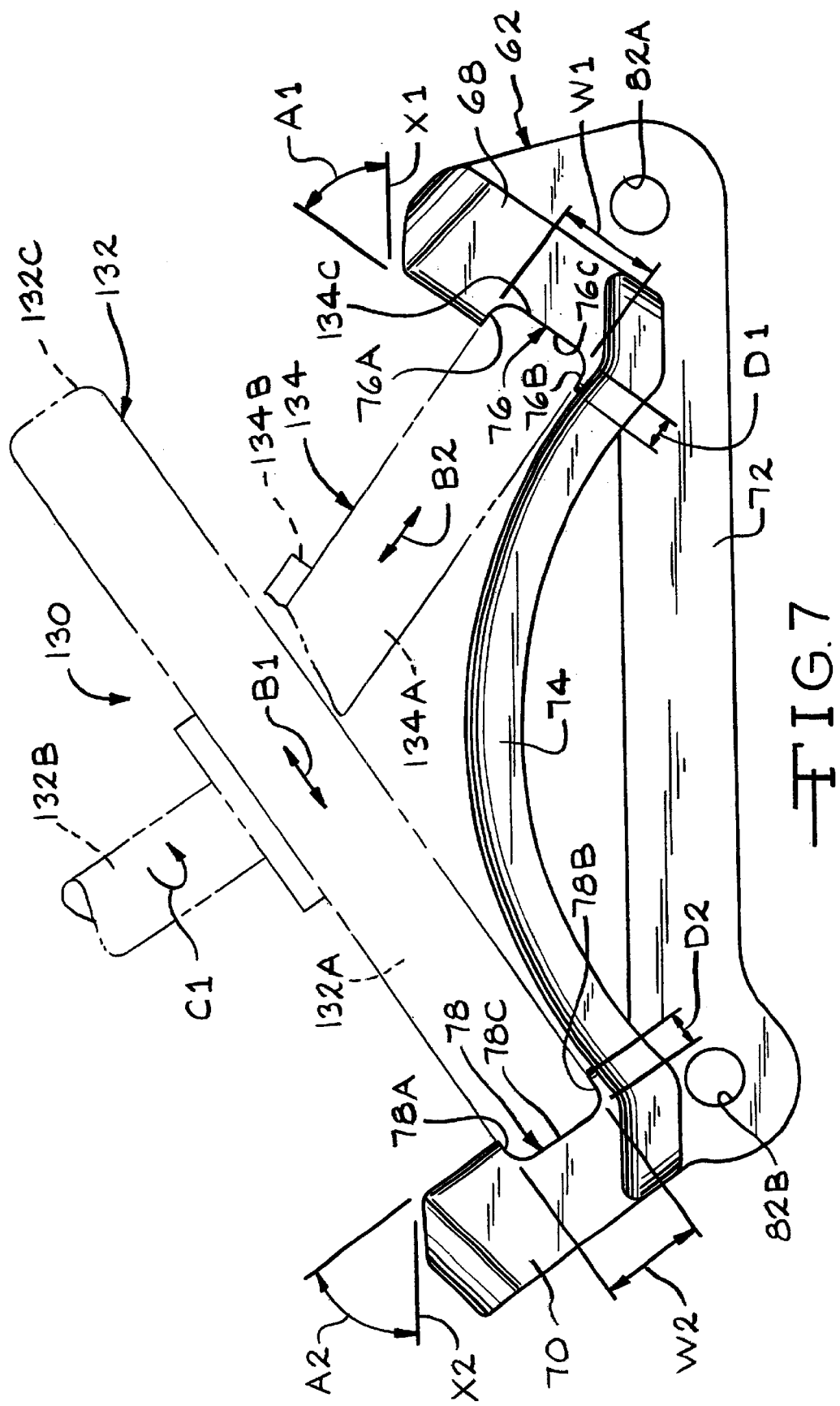
FIG. 7 is a side view showing a preferred tooling apparatus which can be used to produce the anchor bracket of the present invention.

FIG. 7 illustrates a fixture, indicated generally at 130, which can be used to produce the anchor bracket 62 of the present invention. As shown therein, the fixture 130 includes a pair of milling assemblies 132 and 134. The milling assembly 132 includes a milling cutting member 132A and a rotatable member 132B operatively connected to the cutting member 132A. The milling assembly 132 is moveable in a direction toward and away from the arm 70 of the anchor bracket 60 as shown by the double headed arrow B1 by suitable means (not shown), and is moveable in a direction parallel or transverse to the surface 70A of the arm 70 of the anchor bracket 60 by suitable means (not shown). The rotatable member 132B is rotatable in the direction of arrow C1 by suitable means (not shown). The milling cutting member 132A includes a milling end 132C. The milling assembly 134 includes a milling cutting member 134A and a rotatable member 134B operatively connected to the cutting member 134A. The milling assembly 134 is moveable in a direction toward and away from the arm 68 of the anchor bracket 60 as shown by the double headed arrow B2 by suitable means (not shown), and is moveable in a direction parallel or transverse to the surface 68A of the arm 68 of the anchor bracket 60 by suitable means (not shown). The rotatable member 134B is rotatable in the direction of arrow C2 by suitable means (not shown). The milling cutting member 134A includes a milling end 134C. The milling assemblies 132 and 134 are supported by appropriate means (not shown) so as to orient the respective cutting ends 132C and 134C at a desired angle with respect to the anchor bracket 62.

Figure 8:
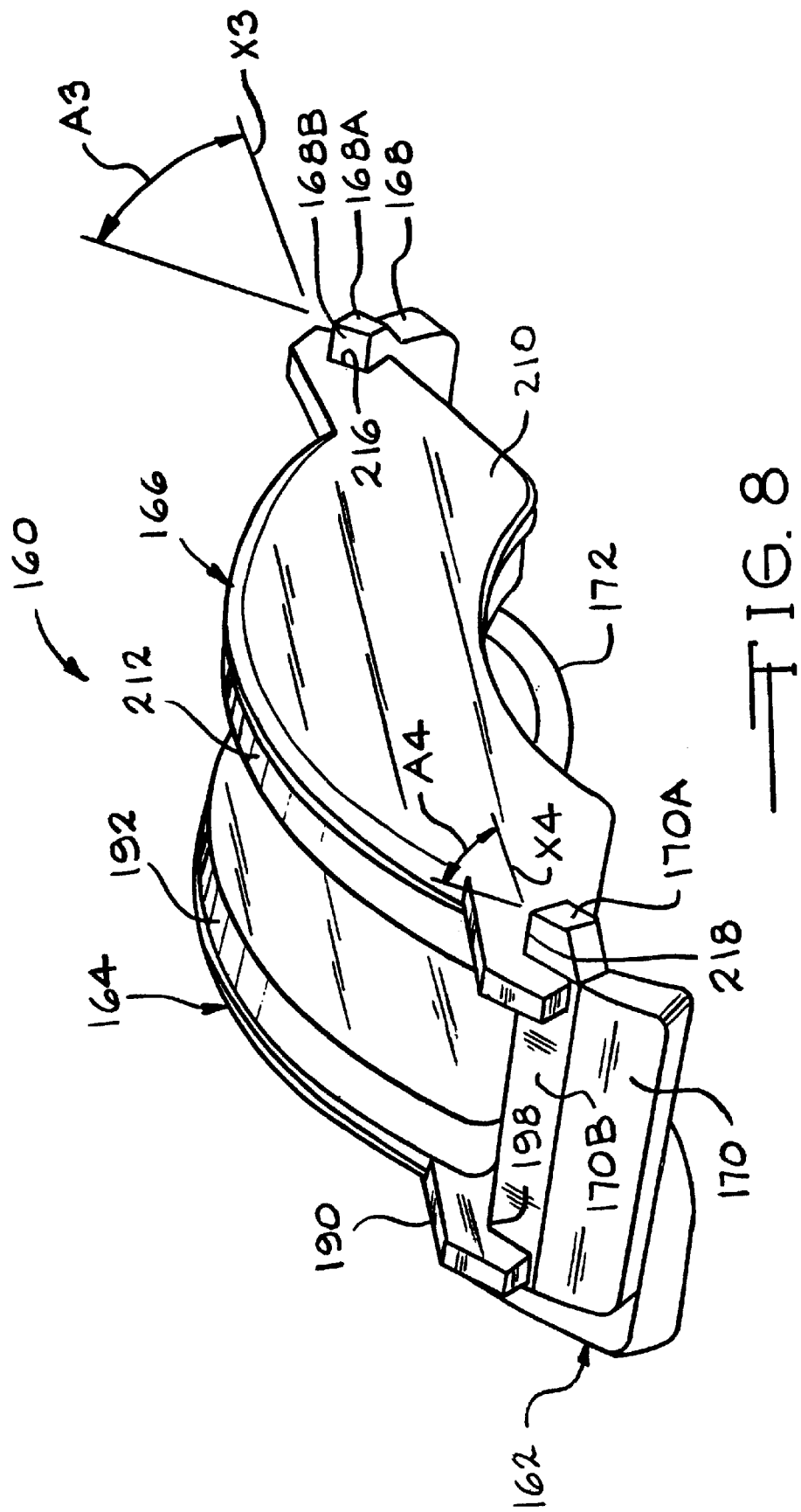
FIG. 8 is a perspective view of a second embodiment of an anchor bracket and brake shoe assembly constructed in accordance with the present invention.

FIG. 8 illustrates a second embodiment of an anchor bracket and brake shoe assembly, indicated generally at 160, and constructed in accordance with the present invention. As shown therein, the anchor bracket and brake shoe assembly 160 is adapted for use with a sliding type of disc brake assembly, such as that disclosed in prior art FIGS. 1–3.

The anchor bracket and brake shoe assembly 160 includes an anchor bracket, indicated generally at 162, and a pair of brake shoes 164 and 166. The anchor bracket 162 includes a pair of axially and outwardly extending angled arms 168 and 170 which are interconnected at their inboard ends by an inner tie bar (not shown).

The arm 168 includes a guide rail 168A which defines a guide rail outer surface 168B which is oriented at an angle A3 relative to a line X3 which is parallel with respect to a longitudinal axis X of the prior art disc brake assembly 10. The angle A3 is between about 35 degrees to about 89 degrees. More preferably, the angle A3 is between about 45 degrees to about 85 degrees. More preferably, the angle A3 is about 55 degrees as illustrated in the embodiment shown in FIG. 8. In the illustrated embodiment, the guide rail 168A has a generally rectangular cross section. As will be discussed below, the particular configuration of the guide rail 168A is selected so as to generally correspond to the profile of the associated ends of the brake shoes 164 and 166 to as to enable the brake shoes 164 and 166 to be disposed thereon in a sliding relationship therewith. Alternatively, the configuration of the guide rail 168A can be other than illustrated if so desired. For example, the guide rail 168A could be generally circular shaped, oval shaped, or any other desired shape.

The arm 170 includes a guide rail 170A which defines a guide rail outer surface 170B which is oriented at an angle relative to a line which is parallel with respect to a longitudinal axis X of the prior art disc brake assembly 10. The angle is between about 35 degrees to about 89 degrees. More preferably, the angle is between about 45 degrees to about 85 degrees. More preferably, the angle is about 55 degrees as illustrated in the embodiment shown in FIG. 8. In the illustrated embodiment, the guide rail 170A has a generally rectangular cross section. As will be discussed below, the particular configuration of the guide rail 170A is selected so as to generally correspond to the profile of the associated ends of the brake shoes 164 and 166 to as to enable the brake shoes 164 and 166 to be disposed thereon in a sliding relationship therewith. Alternatively, the configuration of the guide rail 170A can be other than illustrated if so desired. For example, the guide rail 168A could be generally circular shaped, oval shaped, or any other desired shape.

The anchor bracket 162 further includes a first pair of spaced apart threaded openings (not shown but generally similar to the threaded openings 22A shown in connection with the prior art anchor bracket 22 shown in FIG. 2), and a second pair of spaced apart non-threaded openings (not shown but generally similar to the non-threaded openings 22B shown in connection with the prior art anchor bracket 22 shown in FIG. 2) formed in the inner tie bar 172 thereof. The threaded openings are adapted to receive pins (not shown but generally similar to the pins 20 shown in prior art FIG. 2) in a known manner for supporting and securing a disc brake caliper (such as the prior art caliper 12 shown in prior art FIG. 2). The non-threaded openings are adapted to receive a pair of bolts (not shown) which extend therethrough and which are received in threaded openings provided in the stationary vehicle component (not shown) to thereby secure the anchor bracket 162 to the stationary vehicle component. Alternatively, other known securing means can be provided for securing the anchor bracket 162 to the stationary vehicle component.

The outboard brake shoe 166 is generally arcuate in shape and includes a backing plate 210 and a friction pad 212. The outboard backing plate 210 includes slotted or notched opposed ends 216 and 218 which are adapted to be disposed on the guide rails 168A and 170A, respectively, of the anchor bracket 162. In particular, the ends 216 and 218 of the outboard backing plate 210 are configured so at to generally match the profiles of the respective guide rails 168A and 170A. An anti-rattle clip (not shown) is preferably installed on the guide rail 168A adjacent the trailing end 216 of the outboard backing plate 210 of the outboard brake shoe 166. Alternatively, an anti-rattle clip (not shown) can be installed on the guide rail 170A adjacent the leading end 218 of the outboard backing plate 210 of the outboard brake shoe 166 if so desired.

The inboard brake shoe 164 is generally arcuate in shape and includes a backing plate 190 and a friction pad 192. The inboard backing plate 190 includes slotted or notched ends (only slotted end 198 being illustrated), which are adapted to be disposed on the guide rails 168A and 170A, respectively, of the anchor bracket 162. In particular, the ends 198 of the inboard backing plate 190 are configured so at to generally match the profiles of the respective guide rails 168A and 170A. An anti-rattle clip (not shown) can be installed on the guide rail 168A adjacent the trailing end, on the guide rail 170A adjacent the leading end 198, or on both of guide rails 168A and 170A adjacent the associated ends 198 of the inboard backing plate 190 of the inboard brake shoe 164 if so desired. In the addition, the anchor bracket and brake shoe assembly 160 could include a single anti-rattle (not shown) installed on guide rail 168A adjacent the trailing ends of the brakes shoes 166 and 164, respectively; or a single anti-rattle (not shown) installed on the guide rail 168A adjacent the trailing ends of the brakes shoes 166 and 164, respectively, and a single anti-rattle (not shown) installed on the guide rail 170A adjacent the leading ends 218 and 198 of the brakes shoes 166 and 164, respectively.

Although the anchor bracket and brake shoe assembly 60 and 160 of the, present invention has been illustrated and described in conjunction with the particular vehicle disc brake assemblies disclosed herein, it will be appreciated that this invention can be used in conjunction with other kinds of disc brake assemblies. Also, the anchor bracket 62 and 162 can other than illustrated and described. For example, the anchor bracket 62 and 162 can be formed as part of an integral steering knuckle (not shown).

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A method for producing an anchor bracket adapted for use in a disc brake assembly, the disc brake assembly including a pair of brake shoes supported on the anchor bracket, the method comprising the steps of:

provoiding an anchor bracket having a pair of axially and outwardly extending angled arms, the arms including a pair of inboard ends and a pair of outboard ends, at least one of the inboard ends and the outboard ends of said arms being interconnected by a tie bar;

providing a milling fixture having at least one milling cutting member which is moveable in a direction toward and away from at least one of the arms of the anchor bracket, the milling cutting member including a milling end oriented at a desired angle with respect to the anchor bracket; and operating the milling cutting member whereby the milling end produces a milled slot in each of the arms of the anchor bracket, the milled slots in the arms of the anchor bracket adapted to receive a generally correspondingly shaped end of the brake shoes so as to slibably support the brake shoes on the arms of the anchor bracket.

2. The method according to claim 1 wherein each of the milled slots defines a center, the centers of the milled slots located along a common arc of the anchor bracket.

3. The method according to claim 1 wherein the inboard ends of the arms of the anchor bracket are interconnected by an inner tie bar and the outboard ends of the arms of the anchor bracket are interconnected by an outer tie bar.

4. The method according to claim 1 wherein the milled slot is of a generally rectangular cross section.

5. The method according to claim 1 wherein the anchor bracket further includes a first pair of spaced apart openings and a second pair of spaced apart openings.

6. An anchor bracket produced according to the method of claim 1.

7. A method for producing an anchor bracket adapted for use in a disc brake assembly, the disc brake assembly including a pair of brake shoes supported on the anchor bracket, the method comprising the steps of:

providing an anchor bracket having a pair of axially and outwardly extending angled arms;

providing a milling fixture having at least one milling cutting member which is moveable in a direction toward and away from at least one of the arms of the anchor bracket, the milling cutting member including a milling end oriented at a desired angle with respect to the anchor bracket; and operating the milling cutting member whereby the milling end produces a milled slot in each of the arms of the anchor bracket, each of the milled slots defining a center, the centers of the milled slots being located along a common arc of the anchor bracket, and the milled slots in the arms of the anchor bracket adapted to receive a generally correspondingly shaped end of the brake shoes so as to slibably support the brake shoes on the arms of the anchor bracket.

8. The method according to claim 7 wherein the milled slot is of a generally rectangular cross section.

9. The method according to claim 7 wherein the anchor bracket further includes a first pair of spaced apart openings and a second pair of spaced apart openings.

10. An anchor bracket produced according to the method of claim 7.

11. A method for producing an anchor bracket adapted for use in a disc brake assembly, the disc brake assembly including a pair of brake shoes supported on the anchor bracket, the method comprising the steps of:

providing an anchor bracket having a pair of axially and outwardly extending angled arms, the arms including a pair of inboard ends and a pair of outboard ends, at least one of the inboard ends and the outboard ends of said arms being interconnected by a tie bar, the anchor bracket including a first pair of spaced apart openings and a second pair of spaced apart openings;

providing a milling fixture having at least one milling cutting member which is moveable in a direction toward and away from at least one of the arms of the anchor bracket, the milling cutting member including a milling end oriented at a desired angle with respect to the anchor bracket; and operating the milling cutting member whereby the milling end produces a generally rectangular shaped milled slot in each of the arms of the anchor bracket, the milled slots in the arms of the anchor bracket adapted to receive a generally correspondingly shaped end of the brake shoes so as to slibably support the brake shoes on the arms of the anchor bracket.

12. An anchor bracket produced according to the method of claim 11.

* * * * *